(12) United States Patent
Chesneau et al.

(10) Patent No.: US 11,165,098 B2
(45) Date of Patent: Nov. 2, 2021

(54) SUBSTITUTED ISOXAZOLES FOR LITHIUM BATTERIES

(71) Applicant: Gotion Inc., Fremont, CA (US)

(72) Inventors: Frederick Francois Chesneau, St. Leon-Rot (DE); Stefano Meini, Ludwigshafen (DE); Michael Schmidt, Alsbach-Haehnlein (DE); Denis Schroeder, Schwetzingen (DE); Patrick Krieg, Ludwigshafen (DE); Christian Karcher, Boehl-Iggelheim (DE); Janina Stier, Buerstadt (DE); Wolfgang Klaus, Ludwigshafen (DE); Corinna Tag, Ludwigshafen (DE)

(73) Assignee: Gotion, Inc., Fremont, CA (US)

(*) Notice: Subject to any disclaimer, the term of this patent is extended or adjusted under 35 U.S.C. 154(b) by 0 days.

(21) Appl. No.: 15/567,013

(22) PCT Filed: Apr. 8, 2016

(86) PCT No.: PCT/EP2016/057789
§ 371 (c)(1),
(2) Date: Oct. 16, 2017

(87) PCT Pub. No.: WO2016/166030
PCT Pub. Date: Oct. 20, 2016

(65) Prior Publication Data
US 2018/0138550 A1    May 17, 2018

(30) Foreign Application Priority Data

Apr. 17, 2015 (EP) .................................... 15164034

(51) Int. Cl.
| | |
|---|---|
| H01M 10/0567 | (2010.01) |
| H01M 4/58 | (2010.01) |
| H01M 10/052 | (2010.01) |
| H01M 4/485 | (2010.01) |
| H01M 10/0569 | (2010.01) |
| H01M 4/02 | (2006.01) |

(52) U.S. Cl.
CPC ....... H01M 10/0567 (2013.01); H01M 4/485 (2013.01); H01M 4/5825 (2013.01); H01M 10/052 (2013.01); H01M 10/0569 (2013.01); H01M 2004/028 (2013.01); H01M 2300/0025 (2013.01); H01M 2300/0037 (2013.01)

(58) Field of Classification Search
CPC ......... H01M 10/0567; H01M 10/0569; H01M 10/052; H01M 4/485; H01M 4/5825; H01M 2300/0025; H01M 2300/0037; H01M 2004/028
See application file for complete search history.

(56) References Cited

U.S. PATENT DOCUMENTS

| | | | |
|---|---|---|---|
| 4,489,144 A | 12/1984 | Clark | |
| 6,846,594 B2 | 1/2005 | Kim et al. | |
| 2006/0147809 A1 | 7/2006 | Amine et al. | |
| 2011/0006738 A1* | 1/2011 | Mikhaylik | H01M 4/134 320/134 |

FOREIGN PATENT DOCUMENTS

| | | |
|---|---|---|
| JP | 2006294374 A | 10/2006 |
| WO | 2010053162 A1 | 5/2010 |

OTHER PUBLICATIONS

Google Patents English Translation of Shigeru et al., WO2010053162 (Year: 2010).*
WO 2010053162 Shigeru WIPO machine translation (Year: 2010).*
Stucki et al., "Electrochemical waste water treatment using high overvoltage anodes. Part II: Anode performance and applications", Journal of Applied Electrochemistry, vol. 21, Jan. 1, 1991, pp. 99-104.
Xiao et al., "Electrochemical synthesis of 3,5-disubstituted isoxazoles", Journal of Electroanalytical Chemistry, vol. 727, Jun. 18, 2014, pp. 120-124.

* cited by examiner

Primary Examiner — Cynthia H Kelly
Assistant Examiner — Kirsten B Tysl
(74) Attorney, Agent, or Firm — Scully, Scott, Murphy & Presser, P.C.

(57) ABSTRACT

An electrolyte composition containing at east one compound of formula (I)

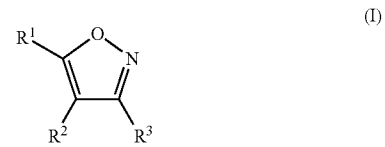

where $R^1$, $R^2$ and $R^3$ are selected independently from each other from H, $C_1$ to $C_{12}$ alkyl, $C_3$-$C_6$ (hetero)cycloalkyl, $C_2$ to $C_{12}$ alkenyl, $C_2$ to $C_{12}$ alkynyl, CN, NR'R", CHO, $C_5$ to $C_{12}$ (hetero)aryl, and $C_6$ to $C_{24}$ (hetero)aralkyl. Alkyl, (hetero)cycloalkyl, alkenyl, alkynyl, (hetero)aryl, and (hetero)aralkyl are optionally substituted with one or more substituents selected from CN, NR'R", and CHO. R' and R" are selected independently from each other from H and $C_1$ to $C_6$ alkyl. At least one of $R^1$, $R^2$ and $R^3$ is not H or $C_1$ to $C_{12}$ alkyl.

14 Claims, No Drawings

SUBSTITUTED ISOXAZOLES FOR LITHIUM BATTERIES

CROSS-REFERENCE TO RELATED APPLICATION(S)

This application claims priority to European Patent Application No. 15164034.9, filed Apr. 17, 2015, the content of which is hereby incorporated by reference in its entirety.

DETAILED DESCRIPTION

The present invention relates to an electrolyte composition containing at least one compound of formula (I)

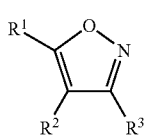

(I)

wherein $R^1$, $R^2$ and $R^3$ are defined below, to the use of compounds of formula (I) as additives in electrochemical cells and to electrochemical cells comprising such electrolyte composition.

Storing electrical energy is a subject of still growing interest. Efficient storage of electric energy would allow electric energy to be generated when it is advantageous and used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3-4 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents. Most state of the art lithium ion batteries in general comprise not a single solvent but a solvent mixture of different organic aprotic solvents.

During charge and discharge of lithium ion batteries various reactions take place at different cell potentials. It is known that during the first charging process (also referred to as "formation") of a lithium ion battery usually an electrically insulating film is formed on the negative electrode surface. This film is often called solid electrolyte interface (SEI) and it is formed by reductive decomposition of components of the electrolyte formulation like solvents, e.g. carbonates, esters, and ethers, and conductive salts on the surface of the anode, especially if the anode active material is a carbonaceous material like graphite. The SEI is permeable for lithium ions and prevents further reduction of the electrolyte by avoiding direct contact with the anode and vice versa. A certain amount of the available lithium from the cathode material is irreversibly consumed for the formation of the SEI, and it is not any more available for cycling. Structure and properties of the SEI may be significantly influenced by addition of suitable chemical compounds which are easily reduced on the anode surface, leading to the formation of a film with different properties than that produced by the base formulation. The use of those suitable compounds represents also a possibility to reduce the amount of irreversibly consumed lithium and thus to improve cell's capacity. The SEI has a significant influence on cycling stability, calendar ageing, and durability (high-current resistance) of an electrochemical or electrooptical device. Different SEI forming additives are known, e.g. isoxazole.

U.S. Pat. No. 6,846,594 B2 describes a lithium secondary battery comprising a positive electrode including a material that is capable of reversible intercalation/deintercalation of lithium ions as a positive active material; a negative electrode including a material that is capable of reversible intercalation/deintercalation of lithium ions as a negative active material; and an electrolyte including a lithium salt; a solvent consisting essentially of at least one carbonate-based organic solvent and at least one aromatic hydrocarbon solvent; and isoxazole, wherein the isoxazole decomposes earlier than the electrolyte organic solvents resulting in an organic SEI film.

U.S. Pat. No. 4,489,144 discloses a nonaqueous cell comprising an organic electrolyte which contains 5-methyl-isoxazole or 3,5-dimethylisoxazole wherein the isoxazoles are added to reduce unwanted active species or impurities causing initially high open circuit voltage values of the cell.

Despite the additives already known for improving the performance of electrochemical cells there is still the demand for further additives for improving properties and performance of electrochemical cells like long cycle life time, cycle stability, rate capability and storage stability of electrochemical cells, e.g. resulting in good capacity retention after storage. It is the object of the present invention to provide further additives for electrochemical cells which improve the properties and the performance of electrochemical cell and to provide electrolyte compositions and electrochemical cells showing good properties and performance like long cycle life time, high cycle stability, good rate capability and good capacity retention after high temperature storage.

This object is achieved by the use of compounds of formula (I)

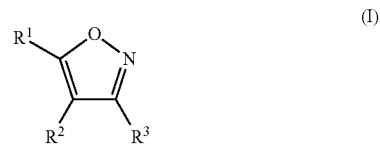

(I)

wherein $R^1$, $R^2$ and $R^3$ are selected independently from each other from H, $C_1$ to $C_{12}$ alkyl, $C_3$-$C_6$ (hetero)cycloalkyl, $C_2$ to $C_{12}$ alkenyl, $C_2$ to $C_{12}$ alkynyl, CN, NR'R", CHO, $C_5$ to $C_{12}$ (hetero)aryl, and $C_6$ to $C_{24}$ (hetero)aralkyl, wherein alkyl, (hetero)cycloalkyl, alkenyl, alkynyl, (hetero)aryl, and (hetero)aralkyl may be substituted by one or more substituents selected from CN, NR'R", and CHO; R' and R" are selected independently from each other from H and $C_1$ to $C_6$ alkyl; and wherein at least one of $R^1$, $R^2$ and $R^3$ is not H or $C_1$ to $C_{12}$ alkyl; as additives in electrolyte compositions for electrochemical cells, in particular as SEI forming additive in electrolyte compositions or for the manufacture of electrochemical cells, and by an electrolyte composition containing at least one compound of formula (I) and by electrochemical cells comprising the electrolyte composition.

Electrochemical cells comprising electrolyte compositions containing a compound of general formula (I) show good capacity retention and rate capability after storage at higher temperatures in the charged state.

In the following the invention is described in detail.

One aspect of the invention relates to electrolyte compositions containing at least one compound of formula (I)

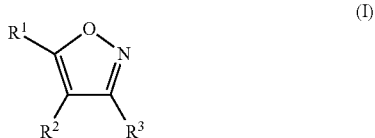
(I)

wherein $R^1$, $R^2$ and $R^3$ are selected independently from each other from H, $C_1$ to $C_{12}$ alkyl, $C_3$ to $C_6$ (hetero)cycloalkyl, $C_2$ to $C_{12}$ alkenyl, $C_2$ to $C_{12}$ alkynyl, CN, NR'R", CHO, $C_5$ to $C_{12}$ (hetero)aryl, and $C_6$ to $C_{24}$ (hetero)aralkyl, wherein alkyl, (hetero)cycloalkyl, alkenyl, alkynyl, (hetero)aryl, and (hetero)aralkyl may be substituted by one or more substituents selected from CN, NR'R", and CHO; R' and R" are selected independently from each other from H and $C_1$ to $C_6$ alkyl; and wherein at least one of $R^1$, $R^2$ and $R^3$ is not H or $C_1$ to $C_{12}$ alkyl.

The term "$C_1$ to $C_{12}$ alkyl" as used herein means a straight or branched saturated hydrocarbon group with 1 to 12 carbon atoms having one free valence and includes, e.g., methyl, ethyl, n-propyl, isopropyl, n-butyl, isobutyl, tert-butyl, n-pentyl, iso-pentyl, 2,2-dimethylpropyl, n-hexyl, iso-hexyl, 2-ethyl hexyl, n-heptyl, iso-heptyl, n-octyl, iso-octyl, n-nonyl, n-decyl and the like. Preferred are $C_1$-$C_{10}$ alkyl groups, more preferred are $C_1$-$C_6$ alkyl groups, even more preferred are $C_1$-$C_4$ alkyl groups, and most preferred are methyl, ethyl, and n- and iso-propyl.

The term "$C_3$ to $C_6$ (hetero)cycloalkyl" as used herein means a saturated 3- to 6-membered hydrocarbon cycle having one free valence wherein one or more of the C— atoms of the saturated cycle may be replaced independently from each other by a heteroatom selected from N, S, O and P. Examples of $C_3$-$C_6$ (hetero)cycloalkyl are cyclopropyl, oxiranyl, cyclopentyl, pyrrolidyl, cyclohexyl, piperidyl and morpholinyl.

The term "$C_2$ to $C_{12}$ alkenyl" as used herein refers to an unsaturated straight or branched hydrocarbon group with 2 to 12 carbon atoms having one free valence. Unsaturated means that the alkenyl group contains at least one C—C double bond. $C_2$-$C_{12}$ alkenyl includes for example ethenyl, 1-propenyl, 2-propenyl, 1-n-butenyl, 2-n-butenyl, iso-butenyl, 1-pentenyl, 1-hexenyl, 1-heptenyl, 1-octenyl, 1-nonenyl, 1-decenyl and the like. Preferred are $C_2$-$C_{10}$ alkenyl groups, more preferred are $C_2$-$C_6$ alkenyl groups, even more preferred are $C_2$-$C_4$ alkenyl groups and in particular ethenyl and 1-propen-3-yl(allyl).

The term "$C_2$ to $C_{12}$ alkynyl" as used herein refers to an unsaturated straight or branched hydrocarbon group with 2 to 12 carbon atoms having one free valence, wherein the hydrocarbon group contains at least one C—C triple bond. $C_2$-$C_{12}$ alkynyl includes for example ethynyl, 1-propynyl, 2-propynyl, 1-n-butynyl, 2-n-butynyl, iso-butinyl, 1-pentynyl, 1-hexynyl, -heptynyl, 1-octynyl, 1-nonynyl, 1-decynyl and the like and the like. Preferred are $C_2$-$C_{10}$ alkynyl, more preferred are $C_2$-$C_6$ alkynyl, even more preferred are $C_2$-$C_4$ alkynyl, in particular preferred are ethynyl and 1-propyn-3-yl (propargyl).

The term "$C_5$ to $C_{12}$ (hetero)aryl" as used herein denotes an aromatic 5- to 12-membered hydrocarbon cycle or condensed cycles having one free valence wherein one or more of the C— atoms of the aromatic cycle(s) may be replaced independently from each other by a heteroatom selected from N, S, O and P. Examples of $C_5$-$C_{12}$ (hetero)aryl are furanyl, pyridinyl, phenyl and naphtyl. Preferred is phenyl.

The term "$C_6$ to $C_{24}$ (hetero)aralkyl" as used herein denotes an aromatic 5- to 12-membered aromatic hydrocarbon cycle or condensed aromatic cycles substituted by one or more $C_1$-$C_6$ alkyl, wherein the wherein one or more of the C— atoms of the aromatic cycle(s) may be replaced independently from each other by a heteroatom selected from N, S, O and P. The $C_6$-$C_{24}$ (hetero)aralkyl group contains in total 6 to 24C-atoms and has one free valence. The free valence may be located at the (hetero)aromatic cycle or at a $C_1$-$C_6$ alkyl group, i.e. $C_6$-$C_{24}$ (hetero)aralkyl group may be bound via the aromatic part or via the alkyl part of the (hetero)aralkyl group. Examples of $C_6$-$C_{24}$ (hetero)aralkyl are methylphenyl, 2-methylfuranyl, 3-ethylpyridinyl 1,2-dimethylphenyl, 1,3-dimethylphenyl, 1,4-dimethylphenyl, ethylphenyl, 2-propylphenyl, and the like.

The phrase "wherein at least one of $R^1$, $R^2$ and $R^3$ is not H or $C_1$ to $C_{12}$ alkyl" means that at least one of $R^1$, $R^2$ and $R^3$ is different from H and $C_1$ to $C_{12}$ alkyl, i.e. the compounds of formula (I) are substituted at least once with a substituent different from $C_1$ to $C_{12}$ alkyl and selected from the list of substituents described above.

Preferably $R^1$, $R^2$ and $R^3$ are selected independently from each other from H, $C_1$ to $C_6$ alkyl, $C_3$ to $C_6$ (hetero)cycloalkyl, $C_2$ to $C_6$ alkenyl, $C_2$ to $C_6$ alkynyl, CN, NR'R", CHO, $C_5$ to $C_{12}$ (hetero)aryl, and $C_6$ to $C_{24}$ (hetero)aralkyl, wherein alkyl, (hetero)cycloalkyl, alkenyl, alkynyl, (hetero)aryl, and (hetero)aralkyl may be substituted by one or more substituents selected from CN, NR'R", and CHO, wherein at least one of $R^1$, $R^2$ and $R^3$ is not H or $C_1$ to $C_6$ alkyl. More preferred $R^1$, $R^2$ and $R^3$ are selected independently from each other from H, $C_1$ to $C_6$ alkyl, CN, NR'R", CHO, and $C_5$ to $C_{12}$ (hetero)aryl, wherein alkyl, and (hetero)aryl may be substituted by one or more substituents selected from CN, NR'R", and CHO, wherein at least one of $R^1$, $R^2$ and $R^3$ is not H or $C_1$ to $C_6$ alkyl.

R' and R" are selected independently from each other from H and $C_1$ to $C_6$ alkyl; preferably R' and R" are selected independently from each other from H and $C_1$ to $C_4$ alkyl, and more preferred R' and R" are H.

According to one embodiment at least one of $R^1$, $R^2$ and $R^3$ is NR'R". In case one of $R^1$, $R^2$ and $R^3$ is NR'R" it is preferred that R' and R" are selected independently from each other from H and $C_1$ to $C_4$ alkyl and more preferred R' and R" are H.

According to another embodiment at least one of $R^1$, $R^2$ and $R^3$ is CN.

According to another embodiment at least one of $R^1$, $R^2$ and $R^3$ is CHO.

According to another embodiment at least one of $R^1$, $R^2$ and $R^3$ is $C_5$ to $C_{12}$ (hetero)aryl or $C_6$ to $C_{24}$ (hetero)aralkyl, which may be substituted by one or more substituents selected from CN, NR'R", and CHO, wherein it is preferred that R' and R" are H. More preferred at least one of $R^1$, $R^2$ and $R^3$ is $C_5$ to $C_{12}$ (hetero)aryl.

According to another embodiment at least of one of $R^1$, $R^2$ and $R^3$ is not H or $C_1$ to $C_{12}$ alkyl and at least one of remaining $R^1$, $R^2$ and $R^3$ is not H. This means, the compound of formula (I) is substituted at least twice, wherein one of the substituent is not $C_1$ to $C_{12}$ alkyl. Examples of compounds of formula (I) wherein one of $R^1$, $R^2$ and $R^3$ is not H or $C_1$ to $C_{12}$ alkyl and one of the remaining $R^1$, $R^2$ and $R^3$ is not H are 5-amino-3-phenylisoxazole and 3-amino-5-methylisoxazole. Preferably at least one of $R^1$, $R^2$ and $R^3$ is NR'R" and at least one of the remaining $R^1$, $R^2$ and $R^3$ is not H.

According to a further embodiment at least of one of $R^1$, $R^2$ and $R^3$ is not H or $C_1$ to $C_{12}$ alkyl and the two remaining $R^1$, $R^2$ and $R^3$ are not H. This means, the compound of formula (I) is substituted threefold, wherein one of the substituents is not $C_1$ to $C_{12}$ alkyl. An example of a compound of formula (I), wherein one of $R^1$, $R^2$ and $R^3$ is not H or $C_1$ to $C_{12}$ alkyl and the remaining two of $R^1$, $R^2$ and $R^3$ are not H is 5-amino-3-methyl-4-isoxazole carbonitrile.

Examples of compounds of formula (I) are 3-amino-5-methylisoxazole, 5-amino-3-phenylisoxazole and 5-amino-3-methyl-4-isoxazole carbonitrile.

The at least one compound of formula (I) is usually present in the electrolyte composition in a concentration range of 0.01 to 5 wt.-%, based on the total weight of the electrolyte composition, preferably in the range of 0.025 to 2.5 wt.-%, more preferred in the range of 0.05 to 1 wt.-%, based on the total weight of the electrolyte composition.

According to one aspect of the invention the compounds of the formula (I), as described above or as described as being preferred, are used as additives in electrolyte compositions for electrochemical cells, in particular preferred the compounds of formula (I) are used as SEI forming additives in electrolyte compositions for electrochemical cells.

SEI forming additives are known to the person skilled in the art. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less vs. $Li^+/Li$ redox couple, such as a graphite anode. In order to determine if a compound qualifies as anode film forming additive, an electrochemical cell can be prepared comprising a graphite electrode and a lithium-ion containing cathode, for example lithium cobalt oxide, and an electrolyte containing a small amount of said compound, typically from 0.01 to 10 wt.-% of the electrolyte composition, preferably from 0.05 to 5 wt.-% of the electrolyte composition.

Upon application of a small current between anode and cathode, the anode potential can be swept from open circuit potential (OCP) to the proximity of $Li/Li^+$ redox potential (e.g., $0.005V_{Li}$). Reduction processes of the electrolyte solution components will be visible as peaks in the cell's differential capacity plot (derivative of capacity by potential, vs. potential). The onset potential, peak intensity and area of those peaks can be taken into consideration to determine whether an additive can be regarded as SEI forming additive. When comparing the differential capacity plots of a base electrolyte formulation and of the base formulation+ additive, an ideal SEI forming additive will have reduction peak (typically at higher voltages) of similar intensity and area of those appearing for the base electrolyte formulation in the first cycle; furthermore, the peak(s) intensity(ies) of the base electrolyte formulation shall be highly reduced or substantially modified in nature. If those requirements are fulfilled, the compound can be regarded as SEI forming additive. Some less efficient SEI forming additives may have much higher peak intensity and peak area, however the reduction/modification of the standard solution's peak intensity should be always be present.

Accordingly, when a compound of the formula (I) is used as additive in an electrolyte composition, the concentration of the compound of formula (I) in the electrolyte composition is typically 0.01 to 5 wt.-%, preferred 0.025 to 2.5 wt.-% and most preferred 0.05 to 1 wt.-%, based on the total weight of the electrolyte composition. Usually the compound(s) of formula (I) are added to the electrolyte composition in the desired amount during or after manufacture of the electrolyte composition.

Viewed chemically, an electrolyte composition is any composition which comprises free ions and as a result is electrically conductive. The most typical electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species.

The inventive electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C.

The electrolyte composition preferably contains at least one aprotic organic solvent, more preferred at least two aprotic organic solvents. According to one embodiment the electrolyte composition may contain up to ten aprotic organic solvents.

The at least one aprotic organic solvent is preferably selected from cyclic and acyclic organic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, cyclic and acyclic esters of carboxylic acids, cyclic and acyclic sulfones, and cyclic and acyclic nitriles and dinitriles.

More preferred the at least one aprotic organic solvent is selected from cyclic and acyclic carbonates, di-$C_1$-$C_{10}$-alkylethers, di-$C_1$-$C_4$-alkyl-$C_2$-$C_6$-alkylene ethers and polyethers, cyclic and acyclic acetales and ketales, and cyclic and acyclic esters of carboxylic acids, even more preferred the electrolyte composition contains at least one aprotic organic solvent selected from cyclic and acyclic carbonates, and most preferred the electrolyte composition contains at least two aprotic organic solvents selected from cyclic and acyclic carbonates, in particular preferred the electrolyte composition contains at least one aprotic solvent selected from cyclic carbonates and at least one aprotic organic solvent selected from acyclic carbonates.

The aprotic organic solvents may be partly halogenated, e.g. they may be partly fluorinated, partly chlorinated or partly brominated, and preferably they may be partly fluorinated. "Partly halogenated" means, that one or more H of the respective molecule is substituted by a halogen atom, e.g. by F, Cl or Br. Preference is given to the substitution by F. The at least one solvent may be selected from partly halogenated and non-halogenated aprotic organic solvents i.e. the electrolyte composition may contain a mixture of partly halogenated and non-halogenated aprotic organic solvents.

Examples of cyclic carbonates are ethylene carbonate (EC), propylene carbonate (PC) and butylene carbonate (BC), wherein one or more H of the alkylene chain may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred cyclic carbonates are ethylene carbonate, monofluoroethylene carbonate and propylene carbonate, in particular ethylene carbonate.

Examples of acyclic carbonates are di-$C_1$-$C_{10}$-alkylcarbonates, wherein each alkyl group is selected independently from each other, preferred are di-$C_1$-$C_4$-alkylcarbonates. Examples are e.g. diethyl carbonate (DEC), ethyl methyl carbonate (EMC), dimethyl carbonate (DMC), and methylpropyl carbonate. Preferred acyclic carbonates are diethyl carbonate (DEC), ethyl methyl carbonate (EMC), dimethyl carbonate (DMC).

In one embodiment of the invention the electrolyte composition contains mixtures of acyclic oganic carbonates and cyclic organic carbonates at a ratio by weight of from 1:10 to 10:1, preferred of from 3:1 to 1:1.

According to the invention each alkyl group of the di-$C_1$-$C_{10}$-alkylethers is selected independently from the other. Examples of di-$C_1$-$C_{10}$-alkylethers are dimethylether, ethylmethylether, diethylether, methylpropylether, diisopropylether, and di-n-butylether, Examples of di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable polyethers are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of cyclic ethers are 1,4-dioxane, tetrahydrofuran, and their derivatives like 2-methyl tetrahydrofuran.

Examples of acyclic acetals are 1,1-dimethoxymethane and 1,1-diethoxymethane. Examples of cyclic acetals are 1,3-dioxane, 1,3-dioxolane, and their derivatives such as methyl dioxolane.

Examples of acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2] octane and 4-ethyl-1-methyl-3,5,8-trioxabicyclo[2.2.2]octane.

Examples of acyclic esters of carboxylic acids are ethyl and methyl formiate, ethyl and methyl acetate, ethyl and methyl propionate, and ethyl and methyl butanoate, and esters of dicarboxylic acids like 1,3-dimethyl propanedioate. An example of a cyclic ester of carboxylic acids (lactones) is γ-butyrolactone.

Examples of cyclic and acyclic sulfones are ethyl methyl sulfone, dimethyl sulfone, and tetrahydrothiophene-S,S-dioxide (sulfolane).

Examples of cyclic and acyclic nitriles and dinitriles are adipodinitrile, acetonitrile, propionitrile, and butyronitrile.

The inventive electrolyte composition usually contains at least one conducting salt. The electrolyte composition functions as a medium that transfers ions participating in the electrochemical reaction taking place in an electrochemical cell. The conducting salt(s) present in the electrolyte are usually solvated in the aprotic organic solvent(s). Preferably the conducting salt is a lithium salt. The conducting salt is preferably selected from the group consisting of Li[$F_{6-x}$P($C_yF_{2y+1}$)$_x$], wherein x is an integer in the range from 0 to 6 and y is an integer in the range from 1 to 20;

Li[B($R^1$)$_4$], Li[B($R^1$)$_2$(O$R^{II}$O)] and Li[B(O$R^{II}$O)$_2$] wherein each $R^1$ is independently from each other selected from F, Cl, Br, I, $C_1$-$C_4$ alkyl, $C_2$-$C_4$ alkenyl, alkynyl, O$C_1$-$C_4$ alkyl, O$C_2$-$C_4$ alkenyl, and O$C_2$-$C_4$ alkynyl wherein alkyl, alkenyl, and alkynyl may be substituted by one or more O$R^{III}$, wherein $R^{III}$ is selected from $C_1$-$C_6$ alkyl, $C_2$-$C_6$ alkenyl, and $C_2$-$C_6$ alkynyl, and (O$R^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

LiClO$_4$; LiAsF$_6$; LiCF$_3$SO$_3$; Li$_2$SiF$_6$; LiSbF$_6$; LiAlCl$_4$, Li(N(SO$_2$F)$_2$), lithium tetrafluoro (oxalato) phosphate; lithium oxalate; and salts of the general formula Li[Z($C_nF_{2n+1}$ISO$_2$)$_m$], where m and n are defined as follows:
m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-dials from which the bivalent group (O$R^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diode is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group (O$R^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (O$R^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B($R^1$)$_4$], Li[B($R^1$)$_2$(O$R^{II}$O)] and Li[B (O$R^{II}$O)$_2$] are LiBF$_4$, lithium difluoro oxalato borate and lithium dioxalato borate.

Preferably the at least one conducting salt is selected from LiPF$_6$, LiBF$_4$, and LiPF$_3$(CF$_2$CF$_3$)$_3$, more preferred the conducting salt is selected from LiPF$_6$ and LiBF$_4$, and the most preferred conducting salt is LiPF$_6$.

The at least one conducting salt is usually present at a minimum concentration of at least 0.1 m/l, preferably the concentration of the at least one conducting salt is 0.5 to 2 mol/l based on the entire electrolyte composition.

The electrolyte composition according to the present invention may contain at least one further additive different from the compounds of formula (I). The further additive may be selected from polymers, SEI forming additives, flame retardants, overcharge protection additives, wetting agents, HF and/or H$_2$O scavenger, stabilizer for LiPF$_6$ salt, ionic salvation enhancer, corrosion inhibitors, gelling agents, and the like.

Examples for polymers used in electrolyte compositions are polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. These polymers may be added to electrolyte compositions containing a solvent or solvent mixture in order to convert liquid electrolytes into quasi-solid or solid electrolytes and thus to improve solvent retention, especially during ageing.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or H$_2$O scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Examples of SEI forming additives are vinylene carbonate and its derivatives such as vinylene carbonate and methylvinylene carbonate; fluorinated ethylene carbonate and its derivatives such as monofluoroethylene carbonate, cis- and trans-difluorocarbonate; propane sultone and its derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalate) borate, and oxalato phosphates including lithium tetrafluoro (oxalate) phosphate; and ionic compounds containing a cation of formula (II)

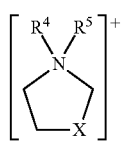

(II)

wherein X is CH$_2$ or NR$^a$, R$^4$ is selected from C$_1$ to C$_6$ alkyl, R$^5$ is selected from —(CH$_2$)$_u$—SO$_3$—(CH$_2$)$_v$—R$^b$, —SO$_3$— is —O—S(O)$_2$— or —S(O)$_2$—O—, preferably —SO$_3$— is —O—S(O)$_2$—, u is an integer from 1 to 8, preferably u is 2, 3 or 4, wherein one or more CH$_2$ groups of the —(CH$_2$)$_u$— alkylene chain which are not directly bound to the N-atom and/or the SO$_3$ group may be replaced by O and wherein two adjacent CH$_2$ groups of the —(CH$_2$)$_u$— alkylene chain may be replaced by a C—C double bond, preferably the —(CH$_2$)$_u$— alkylene chain is not substituted and u u is an integer from 1 to 8, preferably u is 2, 3 or 4, v is an integer from 1 to 4, preferably v is 0, R$^a$ is selected from C$_1$ to C$_6$ alkyl, R$^b$ is selected from C$_1$-C$_{20}$ alkyl, C$_2$-C$_{20}$ alkenyl, C$_2$-C$_{20}$ alkynyl, C$_6$-C$_{12}$ aryl, and C$_6$-C$_{24}$ aralkyl, which may contain one or more F, and wherein one or more CH$_2$ groups of alkyl, alkynyl and aralkyl which are not directly bound to the SO$_3$ group may be replaced by O, preferably R$^b$ is selected from C$_1$-C$_6$ alkyl, C$_2$-C$_4$ alkenyl, and C$_2$-C$_4$ alkynyl, which may contain one or more F, and wherein one or more CH$_2$ groups of alkyl, alkenyl, alkynyl and aralkyl which are not directly bound to the SO$_3$ group may be replaced by O, preferred examples of R$^b$ include methyl, ethyl, trifluoromethyl, pentafluoroethyl, n-propyl, n-butyl, n-hexyl, ethenyl, ethynyl, allyl or prop-1-yn-yl, and an anion selected from bisoxalato borate, difluoro (oxalato) borate, [F$_z$B(C$_m$F$_{2m+1}$)$_{4-z}$]$^-$, [F$_y$P(C$_m$F$_{2m+1}$)$_{6-y}$]$^-$, (C$_m$F$_{2m+1}$)$_2$P(O)O]$^-$, [C$_m$F$_{2m+1}$P(O)O$_2$]$^{2-}$, [O—C(O)—C$_m$F$_{2m+1}$]$^-$, [O—S(O)$_2$—C$_m$F$_{2m+1}$]$^-$, [N(C(O)—C$_m$F$_{2m+1}$)$_2$]$^-$, [N(S(O)$_2$—C$_m$F$_{2m+1}$)$_2$]$^-$, [N(C(O)—C$_m$F$_{2m+1}$)(S(O)$_2$—C$_m$F$_{2m+1}$)]$^-$, [N(C(O)—C$_m$F$_{2m+1}$)(C(O)F)]$^-$, [N(S(O)$_2$—C$_m$F$_{2m+1}$)(S(O)$_2$F)]$^-$, [N(S(O)$_2$F)$_2$]$^-$, [C(C(O)—C$_m$F$_{2m+1}$)$_3$]$^-$, [C(S(O)$_2$—C$_m$F$_{2m+1}$)$_3$]$^-$, wherein m is an integer from 1 to 8, z is an integer from 1 to 4, and y is an integer from 1 to 6.

Preferred anions are bisoxalato borate, difluoro (oxalato) borate, [F$_3$B(CF$_3$)]$^-$, [F$_3$B(C$_2$F$_5$)]$^-$, [PF$_6$]$^-$, [F$_3$P(C$_2$F$_5$)$_3$]$^-$, [F$_3$P(C$_3$F$_7$)$_3$]$^-$, [F$_3$P(C$_4$F$_9$)$_3$]$^-$, [F$_4$P(C$_2$F$_5$)$_2$]$^-$, [F$_4$P(C$_3$F$_7$)$_2$]$^-$, [F$_4$P(C$_4$F$_9$)$_2$]$^-$, [F$_5$P(C$_2$F$_5$)]$^-$, [F$_5$P(C$_3$F$_7$)]$^-$ or [F$_5$P(C$_4$F$_9$)]$^-$, [(C$_2$F$_5$)$_2$P(O)O]$^-$, [(C$_3$F$_7$)$_2$P(O)O]$^-$ or [(C$_4$F$_9$)$_2$P(O)O]$^-$, [C$_2$F$_5$P(O)O$_2$]$^{2-}$, [C$_3$F$_7$P(O)O$_2$]$^{2-}$, [C$_4$F$_9$P(O)O$_2$]$^{2-}$, [O—C(O)CF$_3$]$^-$, [O—C(O)C$_2$F$_5$]$^-$, [O—C(O)C$_4$F$_9$]$^-$, [O—S(O)$_2$CF$_3$]$^-$, [O—S(O)$_2$C$_2$F$_5$]$^-$, [N(C(O)C$_2$F$_5$)$_2$]$^-$, [N(C(O)(CF$_3$)$_2$]$^-$, [N(S(O)$_2$CF$_3$)$_2$]$^-$, [N(S(O)$_2$C$_2$F$_5$)$_2$]$^-$, [N(S(O)$_2$C$_3$F$_7$)$_2$]$^-$, [N(S(O)$_2$CF$_3$)(S(O)$_2$C$_2$F$_5$)]$^-$, [N(S(O)$_2$C$_4$F$_9$)$_2$]$^-$, [N(C(O)CF$_3$)(S(O)$_2$CF$_3$)]$^-$, [N(C(O)C$_2$F$_5$)(S(O)$_2$CF$_3$)]$^-$ or [N(C(O)CF$_3$)(S(O)$_2$—C$_4$F$_9$)]$^-$, [N(C(O)CF$_3$)(C(O)F)]$^-$, [N(C(O)C$_2$F$_5$)(C(O)F)]$^-$, [N(C(O)C$_3$F$_7$)(C(O)F)]$^-$, [N(S(O)$_2$CF$_3$)(S(O)$_2$F)]$^-$, [N(S(O)$_2$C$_2$F$_5$)(S(O)$_2$F)]$^-$, [N(S(O)$_2$C$_4$F$_9$)(S(O)$_2$F)]$^-$, [C(C(O)CF$_3$)3]$^-$, [C(C(O)C$_2$F$_5$)$_3$]$^-$ or [C(C(O)C$_3$F$_7$)$_3$]$^-$, [C(S(O)$_2$CF$_3$)$_3$]$^-$, [C(S(O)$_2$C$_2$F$_5$)$_3$]$^-$, and [C(S(O)$_2$C$_4$F$_9$)$_3$]$^-$.

More preferred the anion is selected from bisoxalato borate, difluoro (oxalato) borate, CF$_3$SO$_3$$^-$, and [PF$_3$(C$_2$F$_5$)$_3$]$^-$.

Preferred SEI-forming additives are oxalato borates, fluorinated ethylene carbonate and its derivatives, vinylene carbonate and its derivatives, and compounds of formula (II). More preferred are lithium bis(oxalato) borate (Li-BOB), vinylene carbonate, monofluoro ethylene carbonate, and compounds of formula (II), in particular monofluoro ethylene carbonate, and compounds of formula (II).

A compound added as additive may have more than one effect in the electrolyte composition and the device comprising the electrolyte composition. E.g. lithium oxalato borate may be added as additive enhancing the SEI formation but it may also be added as conducting salt.

According to one embodiment of the present invention the electrolyte composition contains at least one compound of formula (I), and at least one SEI forming additive, all as described above or as described as being preferred.

In one embodiment of the present invention, the electrolyte composition contains:
  (i) at least one compound of formula (I),
  (ii) at least one organic aprotic solvent,
  (iii) at least one conducting salt, and
  (iv) optionally at least one further additive.

The further additive is different from the compounds of formula (I).

The electrolyte composition preferably contains (i) in total 0.01 to 5 wt.-% of compound(s) of formula (I), preferably 0.025 to 2.5 wt.-%, even more preferably 0.05 to 1 wt.-%.

(ii) in total 60 to 99.89 wt.-% of organic aprotic solvent(s), (iii) in total 0.1 to 25 wt.-% of conducting salt(s), preferably 10 to 20 wt.-%, and (iv) zero to in total 30 wt.-% of further additive(s), preferably 1 to 10 wt.-%, based on the total weight of the electrolyte composition.

The water content of the inventive electrolyte composition is preferably below 100 ppm, based on the weight of the electrolyte composition, more preferred below 50 ppm, most preferred below 30 ppm. The water content may be determined by titration according to ISO760: 1978, as a non-limiting example.

The content of HF of the inventive electrolyte composition is preferably below 60 ppm, based on the weight of the electrolyte composition, more preferred below 40 ppm, most preferred below 20 ppm. The HF content may be determined by titration according to potentiometric or potentiographic titration method.

The electrolyte compositions of the invention are prepared by methods which are known to the person skilled in the field of the production of electrolytes, generally by dissolving the conductive salt in the corresponding solvent mixture and adding the compounds of the formula (I) according to the invention and optionally additional additives, as described above.

The electrolyte compositions are used in electrochemical cells like lithium batteries, double layer capacitors, and lithium ion capacitors, preferably the inventive electrolyte compositions are used in lithium batteries and more preferred in lithium ion batteries.

The invention further provides an electrochemical cell comprising the electrolyte composition as described above or as described as being preferred. The electrochemical cell may be a lithium battery, a double layer capacitor, or a lithium ion capacitor.

The general construction of such electrochemical devices is known and is familiar to the person skilled in this art.

Preferably the electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds; e.g. the lithium battery may be a lithium ion battery, a lithium/sulphur battery, or a lithium/selenium sulphur battery.

In particular preferred the electrochemical device is a lithium ion battery, i.e. a secondary lithium ion electrochemical cell comprising a cathode comprising a cathode active material that can reversibly occlude and release lithium ions and an anode comprising an anode active material that can reversibly occlude and release lithium ions. The terms "secondary lithium ion electrochemical cell" and "(secondary) lithium ion battery" are used interchangeably within the present invention.

The at least one cathode active material preferably comprises a material capable of occluding and releasing lithium ions selected from lithiated transition metal phosphates and lithium ion intercalating metal oxides.

Examples of lithiated transition metal phosphates are $LiFePO_4$ and $LiCoPO_4$, examples of lithium ion intercalating metal oxides are $LiCoO_2$, $LiNiO_2$, mixed transition metal oxides with layer structure having the general formula $Li_{(1+z)}Ni_aCo_bMn_c]_{(1-z)}O_{2+e}$ wherein z is 0 to 0.3; a, b and c may be same or different and are independently 0 to 0.8 wherein a+b+c=1; and $-0.1 \leq e \leq 0.1$, and manganese-containing spinels like $LiMnO_4$ and spinels of general formula $Li_{1+t}M_{2-t}O_{4-d}$ wherein d is 0 to 0.4, t is 0 to 0.4 and M is Mn and at least one further metal selected from the group consisting of Co and Ni, and $Li_{(1+g)}Ni_hCo_iAl_j]_{(1-g)}O_{2+k}$. Typical values for g, h, I, j and k are: g=0, h=0.8 to 0.85, i=0.15 to 0.20, j=0.02 to 0.03 and k=0.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

The anode comprised within the lithium batteries of the present invention comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material is silicon which is able to intercalate lithium ions. The silicon may be used in different forms, e.g. in the form of nanowires, nanotubes, nanoparticles, films, nanoporous silicon or silicon nanotubes. The silicon may be deposited on a current collector. The current collector may be a metal wire, a metal grid, a metal web, a metal sheet, a metal foil or a metal plate. Preferred the current collector is a metal foil, e.g. a copper foil. Thin films of silicon may be deposited on metal foils by any technique known to the person skilled in the art, e.g. by sputtering techniques. One possibility of preparing Si thin film electrodes are described in R. Elazari et al.; Electrochem. Comm. 2012, 14, 21-24. It is also possible to use a silicon/carbon composite as anode active material according to the present invention.

Other possible anode active materials are lithium ion intercalating oxides of Ti.

Preferably the anode active material is selected from carbonaceous material that can reversibly occlude and release lithium ions, particularly preferred the carbonaceous material that can reversibly occlude and release lithium ions is selected from crystalline carbon, hard carbon and amorphous carbon, in particular preferred is graphite. In another preferred embodiment the anode active is selected from silicon that can reversibly occlude and release lithium ions, preferably the anode comprises a thin film of silicon or a silicon/carbon composite. In a further preferred embodiment the anode active is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium batteries may contain further constituents customary per se, for example separators, housings, cable connections etc. The housing may be of any shape, for example cuboidal in the shape of a cylinder, the shape of a prism or the housing used is a metal-plastic composite film processed as a pouch. Suited separators are for example glass fiber separators and polymer-based separators like polyolefin separators.

Several inventive lithium batteries may be combined with one another, for example in series connection or in parallel connection. Series connection is preferred. The present invention further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers. But the inventive lithium ion batteries can also be used for stationary energy stores.

Even without further statements, it is assumed that a skilled person utilize the above description in its widest extent. Consequently, the preferred embodiments and examples are to be interpreted merely as a descriptive enclosure which in no way has any limiting effect at all.

The invention is illustrated by the examples which follow, which do not, however, restrict the invention.

1. Electrolyte Compositions

Electrolyte compositions were prepared containing 1 M LiPF$_6$ in a mixture of ethylene carbonate (EC) and methyl ethylcarbonate (EMC) in a ratio of 3:7 by mass and 0.1 wt-% of different comparative and inventive compounds as shown in Table 1.

TABLE 1

| Example | Structure | Reduction potential peak against Li$^+$/Li [V] |
|---|---|---|
| Inventive example 1 3-Amino-5-methylisoxazole | | 0.80 |
| Inventive example 2 5-Amino-3-phenylisoxazole | | 1.42 and 1.04 |
| Inventive example 3 5-Amino-3-methyl-4-isoxazolecarbonitrile | | 0.96 and 0.76 |
| Comparative example 1 Isoxazole | | 0.88 |
| Comparative example 2 3,5-Dimethylisoxazole | | 0.89 and 0.70 |

2. Electrochemical Tests

Reduction potential peak values were obtained from differential capacity plots of 2032 coin-type cells comprising a CMC-bonded graphite working electrode on a Cu current collector and a PVDF bonded lithium iron phosphate (LFP, BASF) counter electrode (cell voltages were converted into working electrode potential vs. Li$^+$/Li considering an average counter electrode potential of 3.45 V$_{Li}$). Cells were galvanostatically charged at C/100 rate from open circuit voltage to 3.6 V$_{Li}$. In some cases two reduction peaks were detected. The results are shown in Table 1.

High temperature storage stability of Li-ion cells using the electrolytes described above was investigated in a full cell configuration with coin-type cells (2032) with the same anode as described above for the determination of the reduction potential. The cathode used was PVdF (polyvinylidenefluoride)-bonded Li(Ni$_{0.5}$Co$_{0.2}$Mn$_{0.3}$)O$_2$ (also referred to as NCM523) (BASF) on an Al current collector. Cathode capacity was balanced for operating voltages between 3.0 to 4.5 V or 3.0 to 4.3 V (same anode was used in both configurations).

A glass-fiber separator (Whatman GF/D) was used as the separator, which was soaked with 95 μl electrolyte. All cells were assembled in an argon-filled glove box (Unilab, MBraun) having oxygen and water levels below 0.1 ppm. Afterwards the test cells were transferred to a battery test station comprising a Maccor battery test system and a climatic chamber tempered at 25° C.

The high temperature storage stability tests for coin cells started with a formation and conditioning protocol (ca. 20 cycles) at 25° C., comprising one charge discharge cycle at C/10 (formation) followed by one cycle at C/5, four cycles at C/2 which were followed by a rate test at C/5, C/2, 1C, 2C, 3C, 4C, 5C and 6C. The cells were afterwards cycled four times at C/2 and stored in the charged state at 60° C. for 7-days week. After storage battery performance was investigated again at 25° C. The test protocol after storage consisted of a discharge at C/5, cycling four times at C/5 and testing rate capability at C/5, C/2, 1C, 2C, 3C, 4C, 5C and 6C (25° C.). In one set of experiments cycling was done between 3 and 4.3 V and the cells were stored in the charged state (4.3 V), in another set of experiments the cells were cycled between 3 to 4.5 V and the cells were stored in the charged state (4.5 V).

The following terms are used to describe the performance of the cells:

Capacity retention: capacity of the cell on the 5$^{th}$ cycle after storage (25° C., 0.2 C rate), expressed as percentage of the value before storage (25° C., 0.2 C rate)

The reported capacities are discharge capacities.

Rate capability after 7-days storage at 60° C. at 4.5 and 4.3 V, respectively: Percentage of capacity measured at 25° C. after storage based on the capacity measured at the same C-rate at 25° C. before storage.

The results are shown in Tables.

TABLE 2

Capacity retention after 7-days storage at 60° C. in the charged state 4.5 V (% of value before storage)

| | |
|---|---|
| Inventive example 1 | 92.8 |
| Inventive example 2 | 91.3 |
| Inventive example 3 | 93.3 |
| Comparative example 1 | 87.5 |
| Comparative example 2 | 92.8 |

TABLE 3

Rate capability after 7-days storage at 60° C. in the charged state 4.5 V (% of value before storage)

| C-Rate | 0.5 | 1 | 2 | 3 |
|---|---|---|---|---|
| Inventive example 1 | 93.5 | 93.7 | 93.6 | 90.0 |
| Inventive example 2 | 94.0 | 94.9 | 96.0 | 94.0 |
| Inventive example 3 | 94.4 | 94.9 | 95.2 | 93.0 |
| Comparative example 1 | 88.0 | 88.3 | 87.4 | 78.9 |
| Comparative example 2 | 93.4 | 93.7 | 93.8 | 90.8 |

TABLE 4

Capacity retention after 7-days storage at 60° C. in the charged state 4.3 V (% of value before storage)

| | |
|---|---|
| Inventive example 1 | 85.6 |
| Inventive example 2 | 88.8 |
| Comparative example 1 | 86.1 |
| Comparative example 2 | 79.1 |

TABLE 5

Rate capability after 7-days storage at 60° C. in the charged state 4.3 V (% of value after storage)

| C-Rate | 0.5 | 1 | 2 | 3 |
|---|---|---|---|---|
| Inventive example 2 | 91.0 | 92.0 | 93.1 | 90.6 |
| Comparative example 1 | 88.9 | 89.2 | 89.2 | 82.5 |
| Comparative example 2 | 82.0 | 82.5 | 81.4 | 73.0 |

Inventive example 3 shows always better capacity retention and rate capability, inventive example 2 shows better values than comparative examples 1 and 2 with the exception of the capacity retention upon 7-days storage at 60° C. in the charged state 4.5 V (Table 2). Inventive example 1 does not show always better values than both comparative examples 1 and 2, but shows in any case values close or equal to the better one the two comparative examples. In contrast each of the two comparative examples 1 and 2 shows values which are clearly better than the other comparative example in only one set of experiments, either in the experiments after storage in the charged state at 4.3 V or 4.5 V, but not in both as inventive example 1, so the overall performance of inventive example 1 is clearly better than the overall performance the two comparative examples.

What is claimed is:

1. An electrolyte composition containing at least one compound of formula (I)

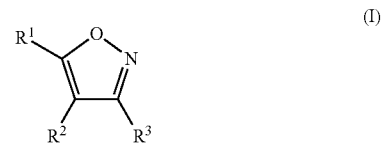

wherein:
R$^1$, R$^2$, and R$^3$ are selected independently from each other from H, C$_1$ to C$_{12}$ alkyl, C$_3$-C$_6$ (hetero)cycloalkyl, C$_2$ to C$_{12}$ alkenyl, C$_2$ to C$_{12}$ alkynyl, CN, NR'R", CHO, C$_5$ to C$_{12}$ (hetero)aryl, and C$_6$ to C$_{24}$ (hetero)aralkyl;
alkyl, (hetero)cycloalkyl, alkenyl, alkynyl, (hetero)aryl, and (hetero)aralkyl are optionally substituted with one or more substituents selected from CN, NR'R", and CHO;
wherein at least one of R$^1$, R$^2$, and R$^3$ is NR'R";
R' and R" are selected independently from each other from H and C$_1$ to C$_6$ alkyl; and
at least one of R$^1$, R$^2$, and R$^3$ is not H or C$_1$ to C$_{12}$ alkyl.

2. The electrolyte composition of claim 1, wherein R' and R" are H.

3. The electrolyte composition of claim 1, wherein at least one of R$^1$, R$^2$, and R$^3$ is CN.

4. The electrolyte composition of claim 1, wherein at least one of R$^1$, R$^2$, and R$^3$ is C$_5$ to C$_{12}$ (hetero)aryl or C$_6$ to C$_{24}$ (hetero)aralkyl, which are optionally substituted with one or more substituents selected from CN, NR'R", and CHO.

5. The electrolyte composition of claim 1, wherein at least one of $R^1$, $R^2$, and $R^3$ is not H or $C_1$ to $C_{12}$ alkyl, and at least one of the remaining $R^1$, $R^2$, and $R^3$ is not H.

6. The electrolyte composition of claim 1, wherein the at least one compound of formula (I) is selected from 3-amino-5-methylisoxazole, 5-amino-3-phenylisoxazole and 5-amino-3-methyl-4-isoxazole carbonitrile.

7. The electrolyte composition of claim 1, wherein the compound of formula (I) is present from 0.01 to 5 wt.-% of the total weight of the electrolyte composition.

8. The electrolyte composition of claim 1, wherein the electrolyte composition contains at least one aprotic organic solvent.

9. The electrolyte composition of claim 1, wherein the electrolyte composition contains at least one conducting salt.

10. The electrolyte composition of claim 1, wherein the electrolyte composition contains at least one additive different from the compound of formula (I).

11. An electrochemical cell comprising the electrolyte composition of claim 1.

12. The electrochemical cell of claim 11, wherein the electrochemical cell is a lithium battery.

13. The electrochemical cell of claim 12, wherein the electrochemical cell comprises a cathode containing at least one cathode active material selected from lithium intercalating transition metal oxides and lithium transition metal phosphates.

14. The electrolyte composition of claim 4, wherein R' and R" are H.

* * * * *